United States Patent [19]

Kinkle

[11] Patent Number: 4,498,824
[45] Date of Patent: Feb. 12, 1985

[54] EXTENDIBLE AND CONTRACTIBLE VEHICLE BULKHEAD

[75] Inventor: Robert W. Kinkle, Wayne, Pa.

[73] Assignee: The Budd Company, Troy, Mich.

[21] Appl. No.: 292,630

[22] Filed: Aug. 13, 1981

[51] Int. Cl.³ .................. B60P 7/14; B61D 45/00; B63B 25/24

[52] U.S. Cl. .................. 410/121; 410/127; 410/129; 410/142

[58] Field of Search .......... 410/121, 122, 123, 124, 410/126, 127, 129, 130, 132, 135, 137, 138, 140, 142

[56] References Cited

U.S. PATENT DOCUMENTS

| 982,571 | 1/1911 | Brown | 410/127 X |
| 2,424,070 | 7/1947 | Welsh | 410/142 |
| 2,978,993 | 4/1961 | Hall | 410/129 |
| 3,451,357 | 6/1969 | Barnard et al. | 410/142 |
| 3,499,395 | 3/1970 | Val Verde | 410/127 |
| 3,791,311 | 2/1974 | Loomis | 410/126 X |

FOREIGN PATENT DOCUMENTS 783383 4/1968 Canada .................. 410/127

Primary Examiner—Robert B. Reeves
Assistant Examiner—Howard Beltran
Attorney, Agent, or Firm—Herman Foster

[57] ABSTRACT

An extendible and contractible bulkhead for a trailer is provided to accommodate high density loads and low density loads requiring more storage space. The bulkhead includes a plurality of spaced diagonal braces for receiving load forces and for transmitting them to the main structure of the trailer.

13 Claims, 9 Drawing Figures

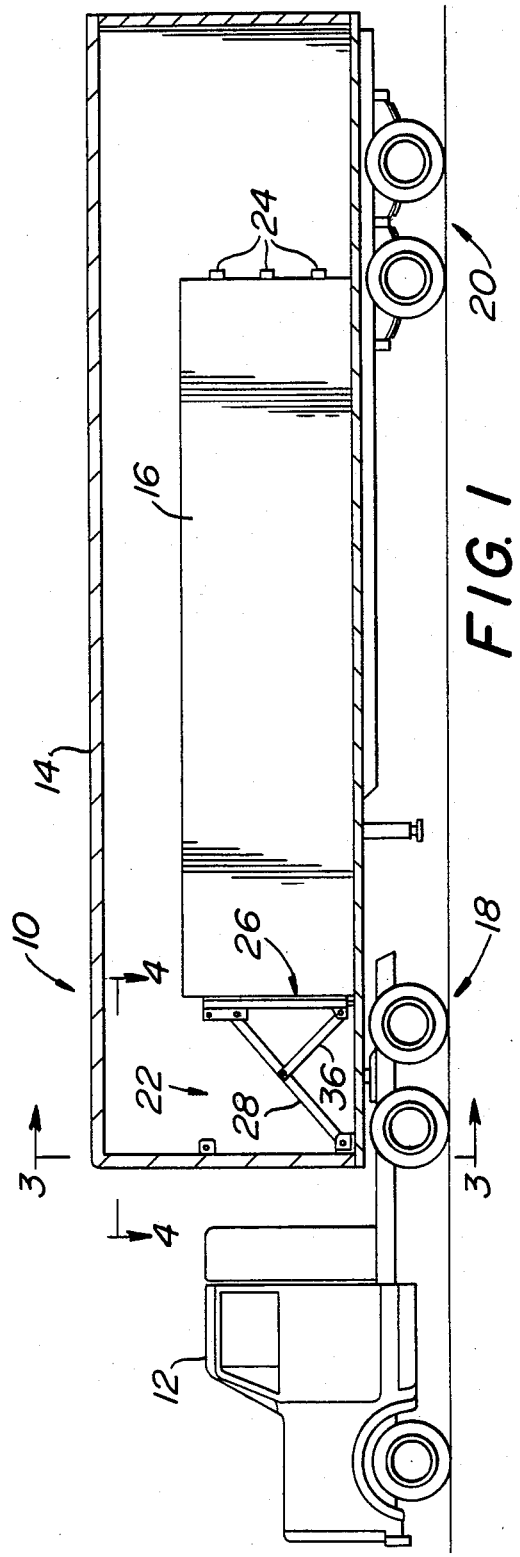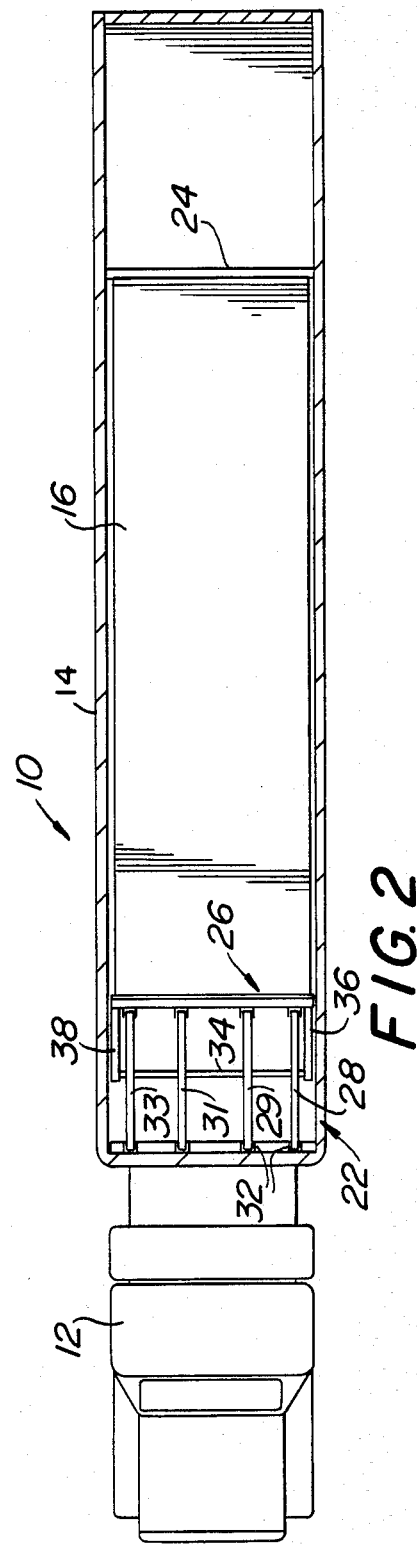

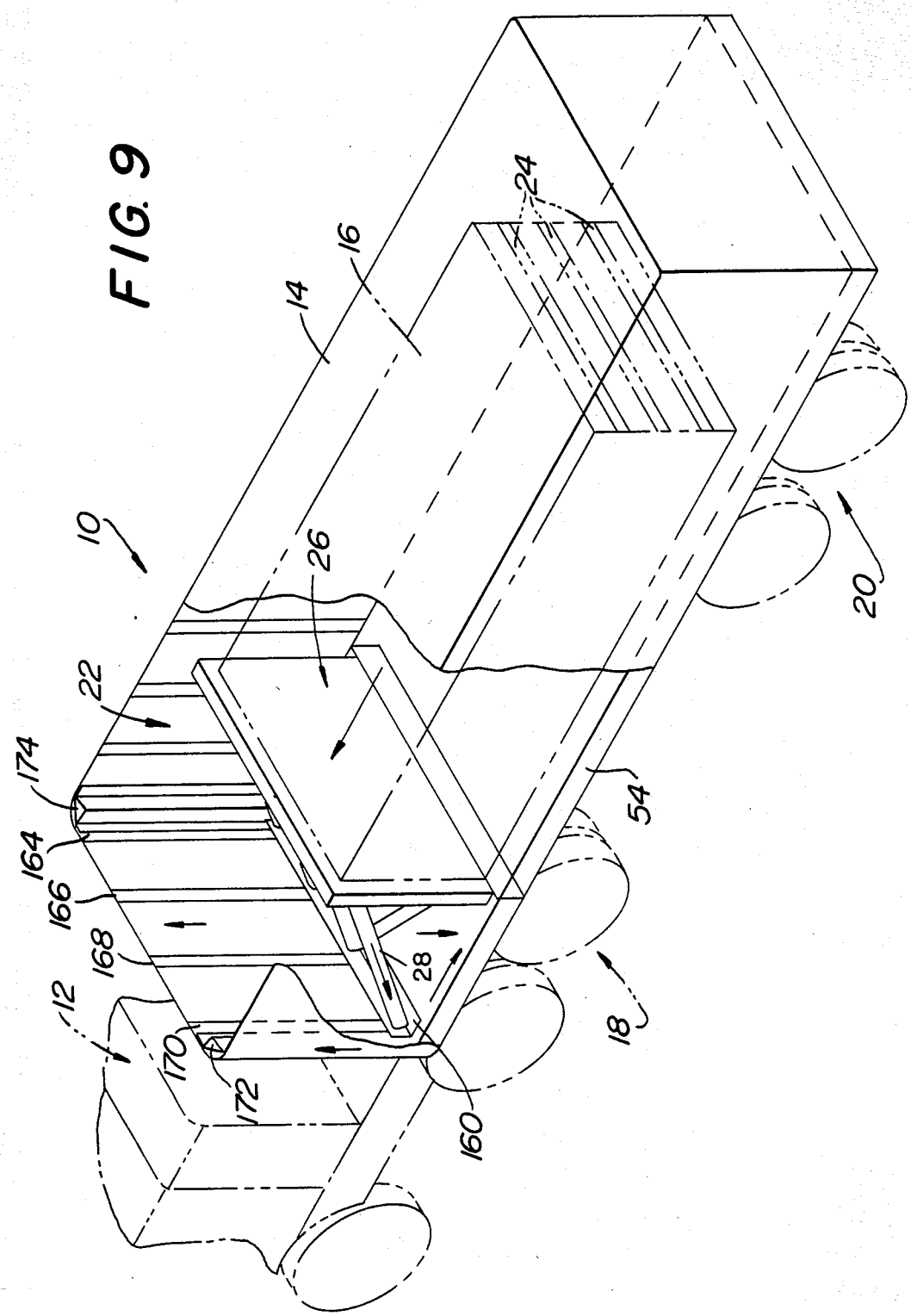

EXTENDIBLE AND CONTRACTIBLE VEHICLE BULKHEAD

BACKGROUND OF THE INVENTION

It is desirable in a trailer that the payload be placed in an area where the load distribution on the tractor-trailer axles is optimized. This means that the load must often be placed towards the center of the trailer when the vehicle is not fully loaded.

Heretofore, shoring bars have been used at the front and rear ends of the load to maintain the load at the desired location. When high density loads are involved, the shoring bars are generally not strong enough to restrain the load when the trailer is braked. In addition to not adequately restraining the load, the forces developed are transmitted directly to local areas of the side walls or other relatively weak structures not built to withstand high load forces. One such high density load, for example, may involve stacks of beer containers. The relatively low friction between the containers cause higher than normal forces to be exerted during a braking operation building up excess stresses in the shoring bars and other parts of the trailer.

While high density loads are important, low density loads must also be considered. For example, maximum space for carrying the low density load is desirable. Consequently, it is necessary that the problems relating to forces caused by high density loads be solved without sacrificing the space requirements for low density loads.

OBJECTS OF THE INVENTION

It is an object of this invention to provide an improved bulkhead which may be extended or contracted for use in a trailer which permits high density type loads when it is extended and maximum space for low density loads when it is contracted.

It is a further object of this invention to provide an improved bulkhead which may be extended or contracted, for use in a trailer which provides restraint for inertia forces produced by braking and for momentum forces induced by the load.

It is still a further object of this invention to provide an improved bulkhead for a trailer, which may be extended or contracted, which includes energy absorption means for impact loading.

It is still a further object of this invention to provide an improved extendible and contractible bulkhead in which the primary loads are carried by the trailer side panels with no attachment of the bulkhead to the trailer side walls or roof.

It is still a further object of this invention to provide an improved extendible and contractible bulkhead for a trailer having improved locking means for safety which is visible to an operator from the rear or bottom of the trailer.

It is still a further object of this invention to provide an improved bulkhead for a trailer capable of handling relatively high loads by causing counter directional moments to be developed and which will not twist or bend during operation because of load eccentricity.

It is still a further object of this invention to provide an improved bulkhead for a trailer which may be used in different types of trailers and which may be readily retrofitted into existing trailers.

SUMMARY OF THE INVENTION

In accordance with the present invention, a bulkhead for a trailer is extendible for high density loads and contractible for low density loads to provide more storage space. The bulkhead comprises a plurality of spaced diagonal brace assemblies capable of withstanding high inertia forces during braking of the trailer and for transmitting the primary loads to the trailer side panels without being attached to the side walls or roof. Energy absorption elements are provided. The bulkhead is adaptable to be used in different types of trailers and may be retrofitted into existing trailers.

Other objects and advantages of the present invention will be apparent and suggest themselves to those skilled in the art, from a reading of the following specification and claims, taken in conjunction with the accompanying drawings, in which:

BRIEF DESCRIPTION OF THE DRAWINGS

FIG. 1 is a side view illustrating a bulkhead embodying the present invention illustrated on a typical trailer carrying a load;

FIG. 2 is a top view of the bulkhead, load and trailer illustrated in FIG. 1;

FIG. 9 is an isometric, somewhat schematic view illustrating the directions of forces transmitted from the load through the bulkhead and to the trailer structure.

DETAILED DESCRIPTION OF THE PREFERRED EMBODIMENTS

Figure 3:
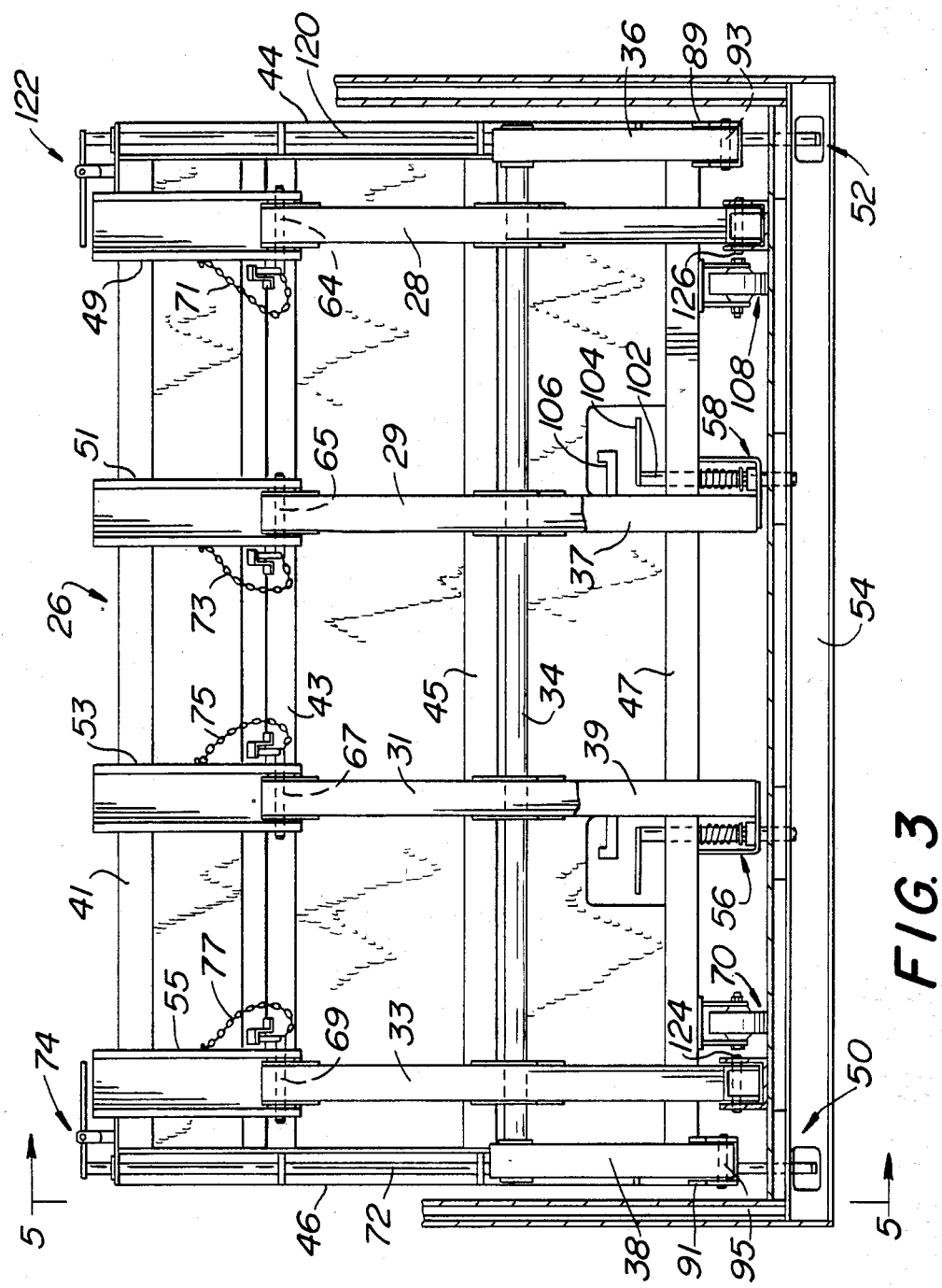
FIG. 3 is a cross-sectional view taken along lines 3—3 of FIG. 1.
Figure 4:
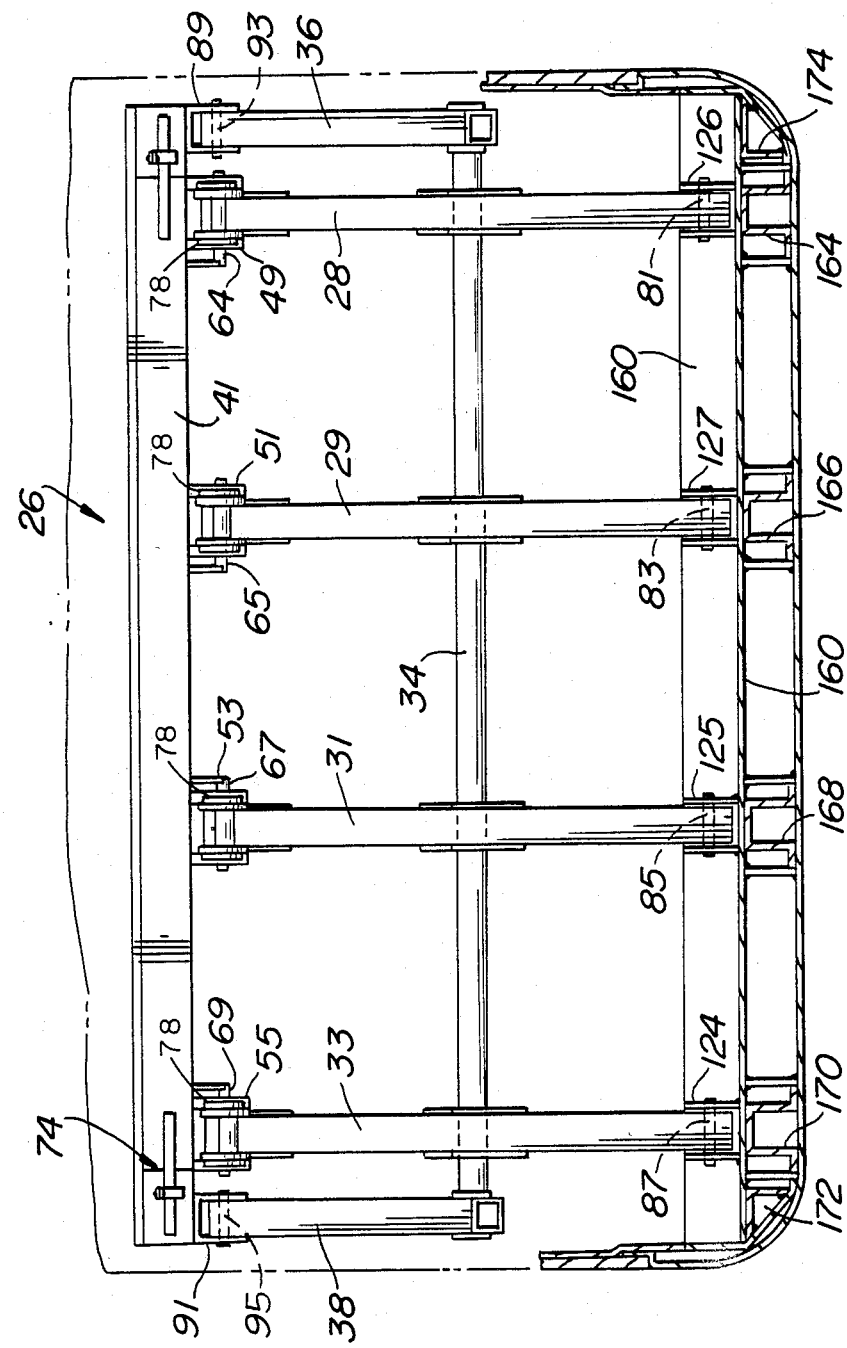
FIG. 4 is a cross-sectional view taken along lines 4—4 of FIG. 1.

Referring to FIGS. 1 and 2, a typical tractor trailer 10 comprises a tractor 12 and a trailer 14. A load 16 is disposed on the floor of the trailer 14 between wheel axle units 18 and 20. The load 16 is preferably placed between the front and rear axles so as to optimize the load distribution at the axles of the wheel axle units.

The load 16 is held in place by a bulkhead 22 disposed toward the front of the trailer 14 and shoring bars 24 disposed toward the rear of the trailer 14. The bulkhead 22 comprises the present invention and will be described in detail in subsequent figures. The bulkhead 22 comprises a diagonal brace arrangement where the forces applied thereto as a result of braking and gravitational forces are transmitted from the front of the load 16 to a structure within the trailer 14. As will be described, the location of the various arms in the bulkhead 22 direct the forces applied thereto to the appropriate stronger points within the trailer structure rather than to local areas of the side walls and other weaker structures within the trailer, as has been done heretofore.

The bulkhead 22 comprises a main front frame 26 which contacts the load 16. The frame may include a plywood panel attached thereto. A plurality of diagonal arms 28, 29, 31 and 33 are pivotally connected between upper areas of the frame 26 and lower pivot mounting points, to be subsequently described. A cross bar 34 extends through the diagonal arms 28, 29, 31 and 33 to end diagonal stabilizer arms 36 and 38. The diagonal stabilizer arms 36 and 38 are connected pivotally between the cross bar 34 and bottom portions of the main front frame at pivot points to be subsequently illustrated and described.

The bulkhead 22 includes the arms 28, 29, 31, 33, 36 and 38 which are designed to receive and transmit the forces developed in the elements of the frame 26 and transmit them into the relatively strong structure of the trailer container 14, such as to reinforced areas in the floor or sidewall frame structures. In addition to providing the means for transmitting the forces, the bulkhead 22 is designed to be collapsible or contractible when it is desired to provide more load space in the trailer 14 for low density loads, for example. As will be described in detail, when it is desired to contract the bulkhead 22, various locking mechanisms, associated with the front frame 26 to keep it in an extended position when high density loads are involved, are released from the floor area of the container 14 permitting the arms 28, 29, 31, 33, 36 and 38 to collapse as the main front frame 26 is rolled toward the front wall of the trailer 14. The various details illustrating this arrangement are shown in connection with FIGS. 3-8, which will be described.

Referring to FIG. 3, the frame 26 comprises a plurality of transverse bars 41, 43, 45 and 47 suitably secured to two end bar assemblies 44 and 46. Vertical bars 37 and 39 are connected to the transverse bars and terminate away from the floor. Additional vertical bars, not illustrated, are connected to the transverse bars (behind arms 28 and 33 in FIG. 3). The bulkhead 22 is illustrated in an extended position in FIGS. 3 and 5. A plurality of channel members 49, 51, 53 and 55 are connected between the top transverse bars 41 and 43 of the frame 26. When the bulkhead 22 is extended as illustrated, the frame 26 is locked in position by locking means secured to the floor of the trailer. Locking mechanisms 50 and 52 extend from the end bar assemblies 44 and 46, respectively, into openings or receptacles in the floor of the trailer, part of which is represented by a cross beam 54. Additional locking mechanisms 56 and 58 are connected between the bottom cross bar 47 and locking receptacles disposed in the floor of the container which receive the lock elements.

The cross bar 34 extends through all of the diagonal arms 28, 29, 31, 33 to the end diagonal bracing arms 36, 38. When the bulkhead 22 is extended as illustrated in FIG. 3, the top end portions of the diagonal arms 28, 29, 31 and 33 are locked to be pivotally mounted within the channel members 49, 51, 53 and 55, respectively. The channel members are secured to the vertical posts of the frame 26, of which only two posts or bars 37 and 39 are illustrated. The other ends of the arms 28, 29, 31 and 33 are secured within brackets secured to the floor of which only two brackets 124 and 126 are illustrated in FIG. 3.

When they are in locked positions, the diagonal arms 28, 29, 31, and 33 are held in positions by locking pins 64, 65, 67 and 69, respectively. When the pins 64, 65, 67 and 69 are in place to hold the diagonal arms 28, 29, 31 and 33, the main frame 26 is maintained in an extended position. At this point, the main frame is locked into recesses or openings in the floor of the trailer. The pins 64, 65, 67 and 69 are secured to chains 71, 73, 75 and 77, respectively, which hold the pins to the channel members 49, 51, 53 and 55 when they are withdrawn to permit contraction of the bulkhead 22. The pins are also used to maintain the bulkhead contracted, as will be described.

When it is desired to collapse or contract the bulkhead 22, the pins 64, 65, 67 and 69 are removed from aligned openings in the channel members and diagonal bars 28, 29, 31 and 33. This permits the entire frame 26 to be rolled on rollers or casters 70 and 108, which are secured to the bottom transverse bar 47. As the frame 26 is rolled towards the front wall of the trailer, the ends of the diagonal arms 28, 29, 31 and 33 ride upwardly within the channel members 49, 51, 53 and 55.

The bottom ends of the arms 28, 29, 31 and 33 are pivotally connected in brackets 126, 127, 125, and 121 secured to the floor of the containers. Pins 81, 83, 85 and 87 extend through openings in the brackets and ends of the arms to hold the arms in position while permitting pivotal movements during the contraction or extension of the bulkhead 22.

The arms 28, 29, 31 and 33 are welded to the center bar 34 for lateral stabilization during the collapsing or expanding of the bulkhead 22. The end diagonal stabilizing arms 36 and 38 are free to rotate at the ends of the cross bar 34 and connected with brackets 89 and 91 which are connected to the ends of end bar assemblies 44 and 46. Pins 93 and 95 pivotally secure the ends of the arms 36 and 38 to the brackets 89 and 91.

The end bar assemblies 44 and 46 include means for locking and unlocking the frame 26 from the floor of the trailer. Locking bars 72 and 120 are disposed to be moved up and down within the assemblies 46 and 44 into or out of the floor of the trailer. The bars 72 and 120 includes handles 74 and 122 at one end thereof. As will be described, the handles 74 and 122 are disposed to raise or lower the bars 72 and 120 into the locking mechanisms 50 and 52.

Figure 5:
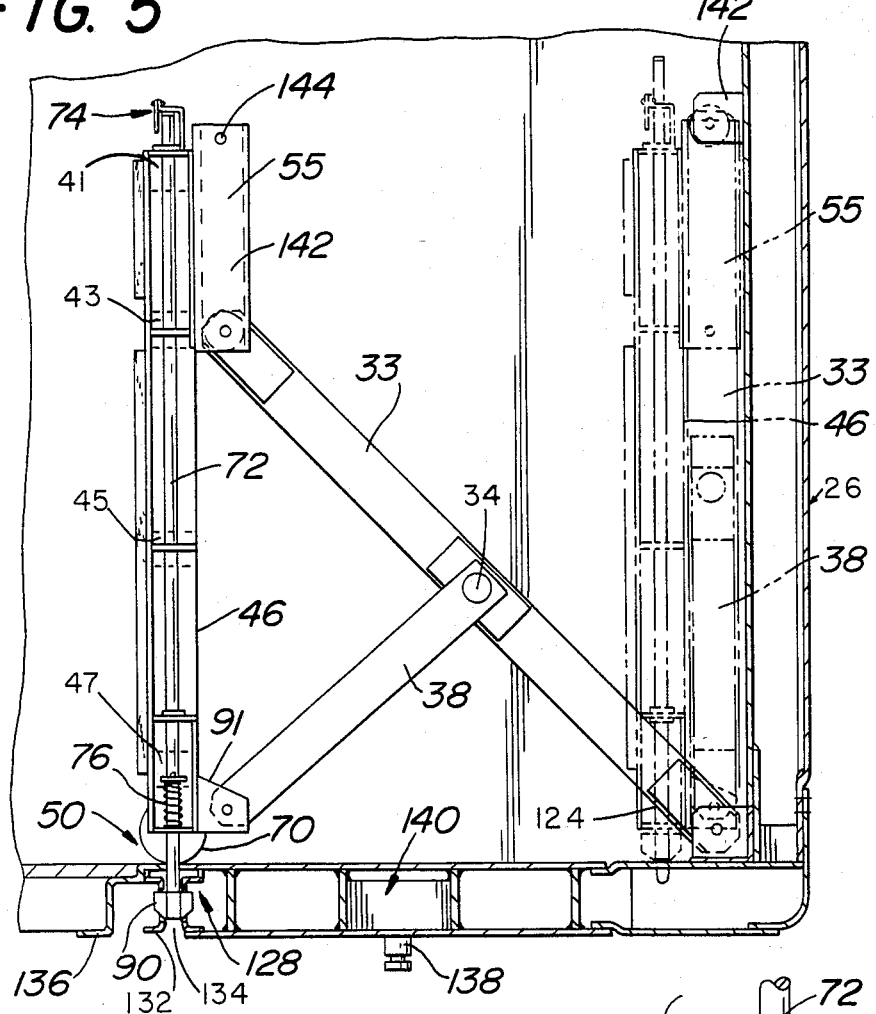
FIG. 5 is a cross-sectional view taken along lines 5—5 of FIG. 3.

Referring to FIG. 5, the end bar assembly 46, similar in operation to the bar assembly 44, includes the locking vertical bar 72 having the handle 74 at its upper end. The bottom end of the bar 72 is inserted into a receptacle 128 which is included in the floor of the trailer. When the handle 74 and the bar 72 are pushed down, the locking bar 72 exerts pressure against a bias spring 76. After the bottom end of the bar 72 is down, the handle 74 is turned 90° to maintain it in a locked position inside the receptacle 128. The lock bars 72 and 120 will be maintained in locked positions until a positive action of turning their respective handles 74 or 122 90° is taken. When the handle 74, for example, is rotated 90°, the element 90 is moved 90° to permit the bottom end of the bar 72 to be removed from the receptacle 128. The bias action of the expansion spring 76 causes the bar 72 to rise. The bar 72 is slightly flexible and serves as an energy absorber when excessive forces are exerted against the frame 26. Further details of the locking action relating to the bar 72 are illustrated in FIG. 8.

Figure 8:
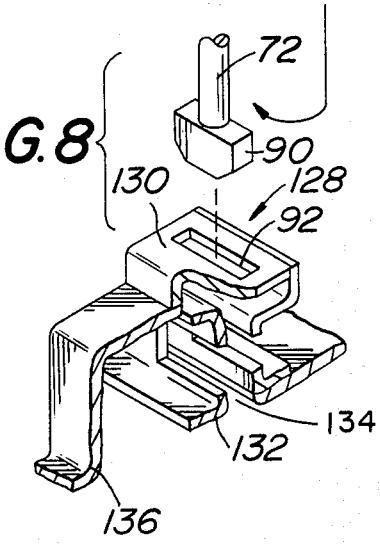
FIG. 8 is an isometric partly broken away view illustrating features of the locking mechanism illustrated in FIG. 5.

In FIG. 8, the receptacle 128 includes a top portion 130 having an opening 92 dimensioned to receive the lock element 90 therethrough. The receptacle 128 also includes a bottom portion 132. A space 134 is provided to receive the element 90 when it is turned 90° from the position illustrated in FIG. 8. The main elements of the receptacle 128 are connected to the top and bottom floor structures. Referring back to FIG. 5, a kingpin 138 is connected to the trailer 14 and is connected to the tractor 12 in a conventional manner. The kingpin 138 is connected to an upper core coupler 140 which comprises a strong transverse frame extending across the floor of the trailer and constituting one of the stronger structural areas of the trailer.

The dashed portions as illustrated in FIG. 5 illustrates the bulkhead 22 in a collapsed or contracted position as when the trailer is carrying a low density load and maximum storage space is desired.

When the bulkhead 22 is to be retracted, the locking pins 64, 65, 67 and 69 are removed from the channel members 49, 51, 53 and 55 to permit upward movement of arms 28, 29, 31 and 33. The lock elements associated with the locking mechanisms 50, 52, 56 and 58 (FIG. 3) are lifted and removed from the floor receptacles. The frame 26 is then rolled towards the front wall of the trailer on rollers 70 and 108.

When the frame 26 is completely contracted, as illustrated in FIG. 5, the channel members 49, 51, 53 and 55 move into brackets secured to the front wall of the trailer, of which only a single bracket 142 is illustrated in FIG. 5. Each of the brackets include openings therein. Each of the channel members 49, 51, 53 and 55 also include openings therein; with only one such opening 144 being illustrated in FIG. 5. The openings in the brackets are aligned with the openings in the channel members to permit pins 64, 65, 67 and 69 previously removed from lower openings in the channel members, to be inserted through the brackets and upper openings of the channel members to lock the frame 26 against the front wall of the trailer.

Figure 6:
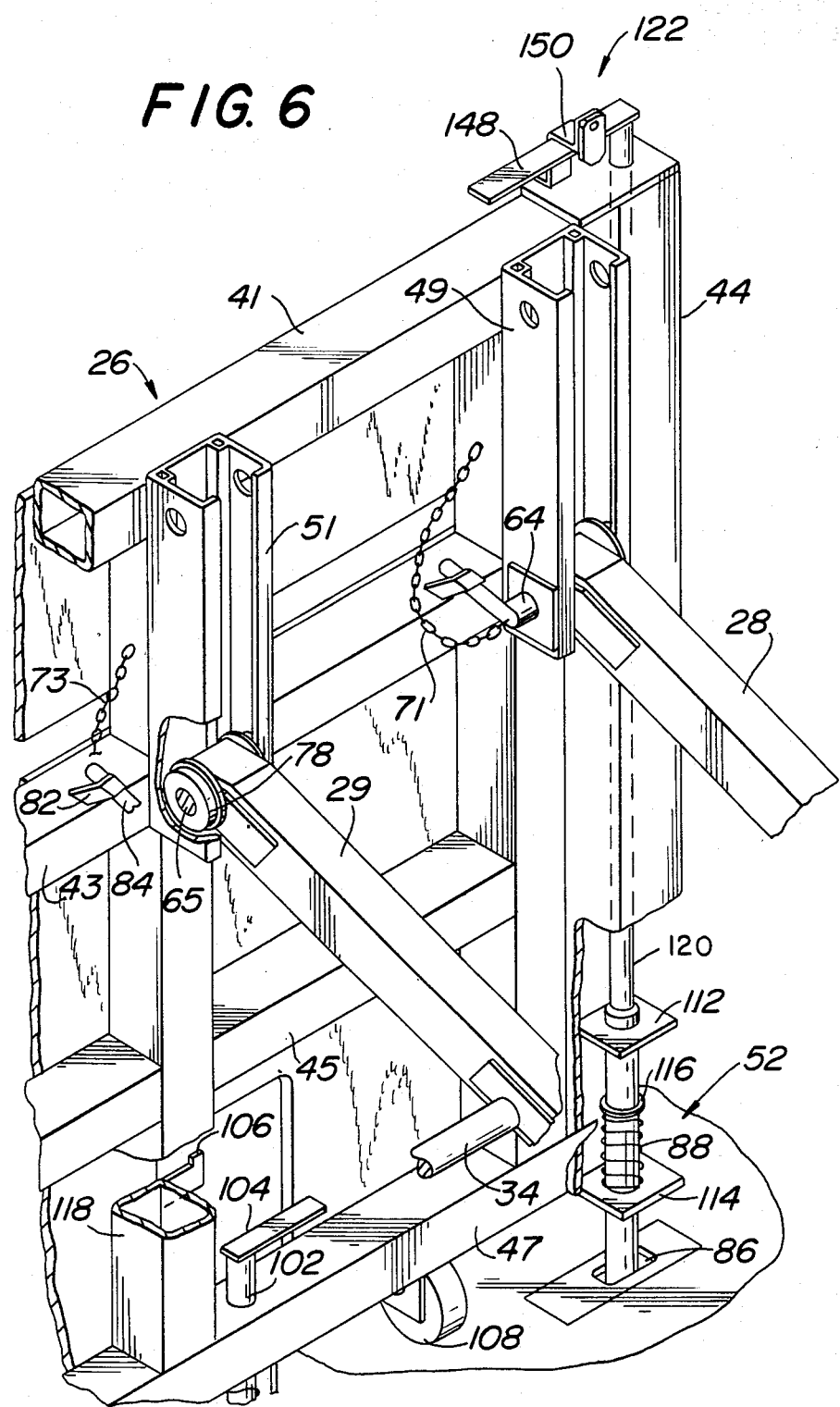
FIG. 6 is an isometric partly broken away view illustrating features of the bulkhead connections of FIGS. 1, 2 and 3.

Referring to FIG. 6, details relating to movements of the arms 28 and 29, as well as additional details of a handle 122, similar to the handle 74, are illustrated. The arrangement with respect to end bar assembly 44 is similar to that of bar assembly 46 in FIG. 5. The end of diagonal arm 29 includes rollers 78 which are adapted to ride in the channel 51 when all the pins in the channel including the pin 65 is removed from the pivot connection. All of the arms 28, 29, 31 and 33 have similar arrangements and only one will be described. The pin 65 is connected to a handle 84 which is held by a bracket 82, which is secured to the cross bar 43. The bracket 82 maintains the handle 84 of the pin 65 in a locked position.

When the frame 26 is extended, the pins through the channel members and bars 28, 29, 31 and 33 provide restraints for excessive loading which may occur during braking of the trailer. When it is desired to collapse the bulkhead 22, the pins 64, 65, 67 and 69 are removed to permit the diagonal beams 28, 29, 31 and 33 to be moved on rollers, such as rollers 78 within the channel members 49, 51, 53 and 55 to collapse the bulkhead assembly. During the collapsing, the assembly is rolled on the floor of the trailer by means of casters 70 and 108.

The locking mechanism 52 associated with the pin bar assembly 44 is similar to that of lock assembly 50 of FIG. 5. A locking bar 120 extends from the handle 122 through a floor opening 86. The handle 122 includes a main manually controlled member 148 disposed to be held by a clamp 150. The member 148 is adapted to be under the clamp 150 when the bar 120 is locked or rotated away from the clamp to permit the bar 120 to be unlocked or lifted. A spring 88 is provided around the locking bar 83 and exerts an upward bias. In order to open the lock, the handle member 148 is pushed down and then rotated 90° in a counterclockwise direction at which point the bias tension of the spring 88 will cause the bottom of the bar 120 to be removed from the opening 86. The bar 120 is aligned by guide elements 112 and 114 within the bar assembly 44. The spring 88 is held against the element 114 by a collar 116 around the bar 83.

Figure 7:
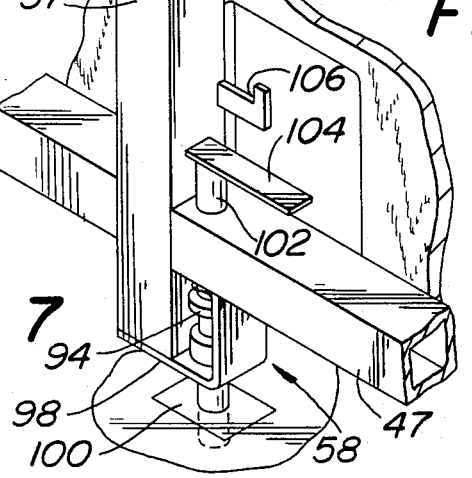
FIG. 7 is an isometric partly broken away view illustrating features of a locking mechanism used in the present invention.

Referring to FIG. 7, details of the locking mechanism 58 similar to the locking mechanism 56 (FIG. 3) are illustrated. A compression spring 94 is disposed between the bottom transverse bar 47 and the bracket 98 secured to the end of a vertical bar 37 which comprises part of the main frame 26. The end of the locking mechanism includes a rod 102 which passes through the bar 47 to an opening 100 which may comprise a suitable receptacle in the trailer floor. The end of the rod 102 is connected to a handle 104. When the lock is lifted or opened by rotating the handle 104, the handle may be lifted to rest on a bracket 106. The compression spring 94 normally biases the arm 102 downwardly in a locked position Referring to FIG. 4, the arms 28, 29, 31 and 33 are pivotally connected to brackets by means of pins 81, 83, 85 and 87 respectively. The brackets are connected to a floor plate 160 secured to the front wall of the trailer. The brackets 126, 127, 125 and 124 are in alignment with vertical posts 164, 166, 168 and 170 which receive forces transmitted through the arms 28, 29, 31 and 33. The front wall structure also transmits forces to corner posts 172 and 174. Thus the forces and stress built up in the bulkhead 22 are transmitted to relatively strong structures within the trailer frame.

FIG. 9 illustrates the general directions of the forces developed in the bulkhead 22 as a result of forces from the load 26 which may result from sudden braking, for example. The forces developed in the diagonal bars 28, 29, 31 and 33 (FIGS. 3 and 4) are transmitted to the angle floor plate 160. The forces from the plate 160 are reacted upwardly through the vertical posts 164, 166, 168 and 170 and corner posts 172 and 174.

Rotational forces are also developed in the frame 26 and are transferred from the corner, vertical post and structural cross members 132 and 134 to the side assembly of the trailer. This side assembly constitutes the strongest structure within the trailer and is capable of withstanding high forces directed thereto.

Basically, the present invention has provided a diagonal bracket arrangement for absorbing forces which may be extended or contracted. In an extended position, various locking means are provided to secure the main force receiving element to the floor of the trailer. Additional locking mechanisms are provided for securing the brace arms when the bulkhead is expanded. In a collapsed or contracted position, the various locking mechanisms are removed from the floor and the various arms in the bulkhead are disconnected to permit the arms to collapse so that the entire bulkhead may occupy a minimum amount of space in a collapsed position.

What is claimed is:

1. An extendible and contractible bulkhead for attachment to a floor of a trailer including a front wall connected thereto comprising:
   (a) a main frame adapted to receive load forces from a load on the floor of said trailer,
   (b) a plurality of spaced arms pivotally connected to said main frame at one set of ends and to the floor of said trailer at the other set of ends to receive the forces developed in said main frame and transmit them to the floor and front wall of said trailer;

(c) said one set of ends of said arms being disposed to move vertically on said main frame when said bulkhead is extended and contracted;
(d) stabilizing means secured between said main frame and said plurality of arms to maintain said main frame vertically when said bulkhead is extended or contracted;
(e) said stabilizing means comprising a horizontal bar extending through said arms intermediate the ends of said main frame;
(f) a pair of stabilizing arms spaced from opposite sides of said plurality of arms and connected between opposite ends of said horizontal bar and bottom portions of said main frame;
(g) locking receptacles provided in the floor of said trailers;
(h) locking mechanisms including movable lock elements secured to said main frame; and
(i) said lock elements being disposed to move into said receptacles to lock said main frame at a predetermined position and removed from said receptacles to permit said main frame to be moved toward said front wall of said trailer.

2. A bulkhead as set forth in claim 1 wherein said main frame comprises a plurality of vertical posts having said locking mechanisms secured to the lower ends thereof.

3. A bulkhead as set forth in claim 2 wherein said main frame includes a plurality of horizontal bars.

4. A bulkhead as set forth in claim 3 wherein an angle strip is connected to a floor and floor wall of said trailer, and a plurality of mounting brackets are secured thereto to receive said other set of the ends of said arms therein.

5. A bulkhead as set forth in claim 4 wherein a plurality of spaced channel members are secured to the upper ends of the vertical posts of said main frame to receive said set of ends of said arms therein.

6. A bulkhead as set forth in claim 5 wherein roller elements are secured to said set of ends of said arms and disposed to roll within said channel members.

7. A bulkhead as set forth in claim 5 wherein roller members are secured to the bottom portion of said main frame to permit said frame to be rolled toward and away from the front wall of said trailer.

8. A bulkhead as set forth in claim 7 wherein a plurality of spaced second brackets are connected to said front wall of said trailer to receive said channel members therein when said bulkhead is contracted with said main frame in close proximity to said front wall.

9. A bulkhead as set forth in claim 8 wherein said set of ends of said arms are disposed to be locked within said channel members at selected one of at least two different locations dependent upon whether said bulkhead is contracted with said main frame in close proximity to said front wall and is extended with said main frame disposed away from said front wall located to receive forces from a load.

10. A bulkhead as set forth in claim 9 wherein each of said channel members include upper and lower openings to receive movable pin elements therethrough.

11. A bulkhead as set forth in claim 10 wherein said pin elements are disposed to extend through said lower openings in said channel members and end openings in said set of ends of said arms to lock said bulkhead in an extended position.

12. A bulkhead as set forth in claim 11 wherein said plurality of said second brackets include openings therein disposed in alignment with the upper openings in said channel members when said bulkhead is contracted whereby said movable pins may be inserted through the openings in said second bracket and the upper openings of said channel members to lock said bulkhead in a contracted position.

13. A bulkhead as set forth in claim 12 wherein said locking mechanisms include bias springs associated with said lock elements, and handles connected to the upper ends of said lock elements which must be selectively manually operated to extend and remove said lock elements from the receptacles in the floor of said trailer.

* * * * *